United States Patent [19]

Marsh

[11] Patent Number: 5,227,962
[45] Date of Patent: Jul. 13, 1993

[54] FILTER AND POWER FACTOR COMPENSATION NETWORK

[75] Inventor: Richard N. Marsh, Cool, Calif.

[73] Assignee: Constant Velocity Transmission Lines, Inc., Auburn, Calif.

[21] Appl. No.: 885,312

[22] Filed: May 18, 1992

Related U.S. Application Data

[63] Continuation-in-part of Ser. No. 665,325, Mar. 6, 1991, abandoned.

[51] Int. Cl.[5] .................. H02M 1/12; H03H 7/00
[52] U.S. Cl. .................. 363/39; 333/174; 333/175; 333/176; 323/208
[58] Field of Search .......... 363/39; 333/173, 174, 333/175, 176, 168; 323/208

[56] References Cited

U.S. PATENT DOCUMENTS 2,662,216 12/1953 Klinkhamer .................. 333/168
4,272,743 6/1981 Evans .................. 333/176

Primary Examiner—Emanuel T. Voeltz
Attorney, Agent, or Firm—Fliesler, Dubb, Meyer & Lovejoy

[57] ABSTRACT

A filter network adapted to be placed in parallel with a power supply which provides a high impedance to the 60 Hz utility frequency but acts like a short circuit to all higher frequencies. The network comprises a plurality of parallel circuits, each of which comprise a capacitor, an inductor and a resistor in series with a second resistor coupled in parallel with the inductor. Signal levels above 60 Hz in a prototype circuit using seven such parallel circuits with a parallel capacitor coupled thereto shows that above 60 Hz the signal from the power supply is attenuated by 25-30 dB at 1 KHz and that the impedance is substantially resistive beyond 1 KHz. To maximize the power factor of the circuit comprising the network and consequently the dynamic range of audio equipment coupled thereto, the magnitude of the total capacitance of the network is chosen to be as close as possible to the magnitude of the input inductance of the audio equipment. Switches are provided for selectively adjusting the number of parallel circuits in the network to change its frequency response as well as to accommodate loads having different input inductive reactance at 60 Hz.

13 Claims, 4 Drawing Sheets

FILTER AND POWER FACTOR COMPENSATION NETWORK

CROSS-REFERENCE TO RELATED APPLICATIONS

The present application is a continuation-in-part of application Ser. No. 07/665,325, filed Mar. 6, 1991, now abandoned and assigned to the assignee of the present application.

BACKGROUND OF THE INVENTION

1. Field of the Invention

The present invention relates to A.C. power supplies for supplying power to audio signal generating and transmission equipment in general and in particular to a method and apparatus comprising a filter and power factor compensation network for providing a low and stable, i.e. resistive, impedance to frequencies above 60 Hz and maximizing the efficiency at which power is delivered to such equipment at 60 Hz.

2. Description of the Related Art

Certain audio equipment is sensitive to high frequency noise induced fluctuations in the impedance of a conventional 60 Hz power source providing power to the equipment. This sensitivity can adversely affect the quality, e.g. fidelity or clarity, of and generate noise in the audio signals being propagated in the equipment.

Audio equipment is also sensitive to the amount of power being delivered to the equipment. If too little power is delivered, the dynamic range of the equipment is degraded.

The amount or magnitude of the power delivered to a load is defined by the equation $$\text{Power} = EI \text{ Cosine } \phi$$

where Cosine $\phi$ is defined as the power factor and $\phi$ is the angle between the applied voltage E and current I.

Audio equipment, such as amplifiers, tape decks, compact disc players, etc., comprise inductive loads including input power transformers and/or motors which typically produce a phase shift between the applied voltage E and current I and consequently a power factor of less than 1 in the circuit supplying the power. Heretofore, no method or apparatus has been generally available to operators of audio equipment for use in compensating for a low power factor or for adjusting the power factor for different inductive loads presented by audio equipment coupled to a source of 60 Hz power.

SUMMARY OF THE INVENTION

In view of the foregoing, principal objects of the present invention are a method and apparatus comprising a filter and power factor compensation network which can be coupled to a source of 60 Hz A.C. power supplying audio equipment, for providing a high impedance to frequencies at and below the normal 60 Hz utility power frequency and a low, preferably negligible, and stable impedance to frequencies above 60 Hz and for maximizing the power factor with respect to and hence the efficiency of the delivery of power to the equipment.

In accordance with the above objects there is provided a filter and power factor compensation network as described above which is adapted to be plugged into one of the female sockets in a conventional duplex socket, a conventional power strip or the like, for providing the above described impedance and power factor levels. In this manner the filter and power factor compensation network is placed in parallel with the lines supplying power to the audio equipment at a point near the equipment.

In one embodiment of the present invention, the filter and power factor compensation network comprises a plurality of parallel coupled resonant circuits. Each of the resonant circuits has a different resonant frequency above 60 Hz and comprises an inductor coupled in series with a capacitor.

In another embodiment of the present invention a resistance is coupled in series with the inductor and capacitor in each of the resonant circuits for damping oscillatory or ringing behavior of the circuit.

In another embodiment of the present invention a resistance is coupled in parallel with the inductor in each of the resonant circuits for limiting the normal impedance rise due to the inductive impedance of the inductor as a function of an increase in frequency. This will cause the resonant circuit to be resistive at frequencies above resonance.

In each of the embodiments of the present invention the magnitude of the total capacitance in the filter network therein is made equal to the input inductance of the load coupled to the power supply line or to a value which approximates the average input inductance of typical audio equipment coupled thereto for maximizing the power factor with respect to power being delivered to the equipment.

In still another embodiment of the present invention switches are provided in series with one or more of the resonant circuits for use by operators to selectively change the impedance of the filter networks and maximize the power factor of the circuit as desired.

BRIEF DESCRIPTION OF THE DRAWINGS

The above and other objects, features and advantages of the present invention will become apparent from the following detailed description of the accompanying drawings, in which.

DESCRIPTION OF THE PREFERRED EMBODIMENTS

The method and apparatus of the present invention comprises a filter and power factor compensation network that when bridging an A.C. power line will make the A.C. power line appear to have a very high impedance at the conventional 60 Hz utility frequency and a very low, preferably negligible, and stable impedance to all higher frequencies. Capacitors are provided in the network and are selectable to adjust the power factor of the power being delivered to different loads. As will be further described below, the device is placed across the A.C. utility power line and therefore is not in the series path between the utility power and the equipment being powered.

The device of the present invention comprises multiple series resonant circuits which are placed in parallel across the A.C. utility power line wherein each of the series resonant circuits is tuned to a different frequency above 60 Hz.

Figure 1:
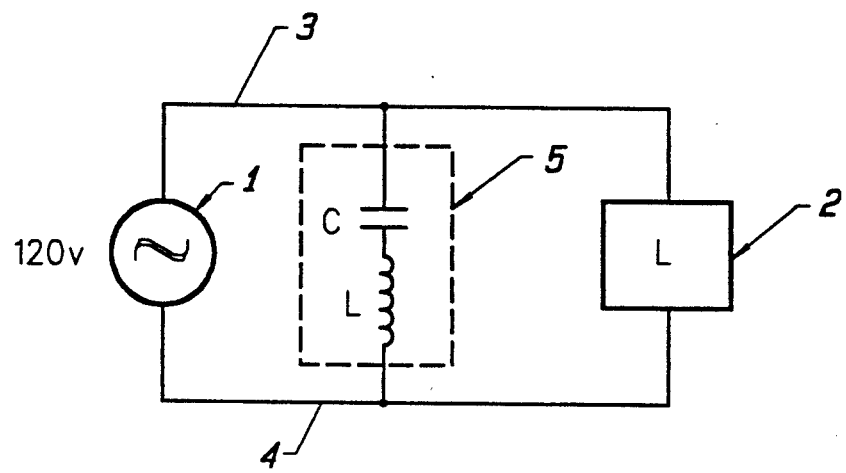
FIG. 1 is a schematic diagram of a single series resonant LC circuit coupled across the output of a source of A.C. power.

Referring to FIG. 1, there is shown a 60 Hz, 120 volt source of A.C. power 1, coupled to a load 2, such as audio signal generating and transmission apparatus, by means of a first and a second power supply line 3 and 4. Coupled in parallel across the source 1 there is provided an LC network designated generally as 5 comprising a capacitor C and an inductor L coupled in series. The network 5 is tuned to have a resonant frequency $F_R$ above 60 hz.

Figure 2:
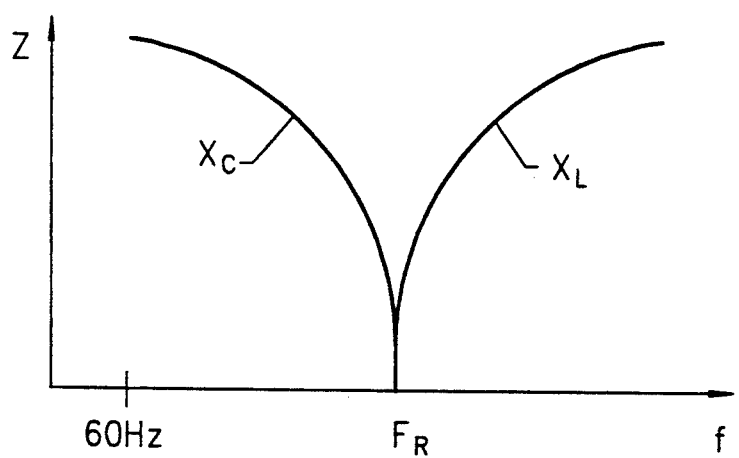
FIG. 2 is a representative plot of impedance v. frequency of a single series LC circuit as shown in FIG. 1.

Referring to FIG. 2, there is shown a representative plot of impedance v. frequency for the circuit of FIG. 1 having a node at the resonant frequency thereof $F_R$ which is located above 60 Hz. As shown in FIG. 2, the impedance of the circuit of FIG. 1 is generally capacitive below the frequency $F_R$ as represented by the curve $X_C$ and inductive above the frequency $F_R$ as shown by the curve $X_L$.

Figure 3:
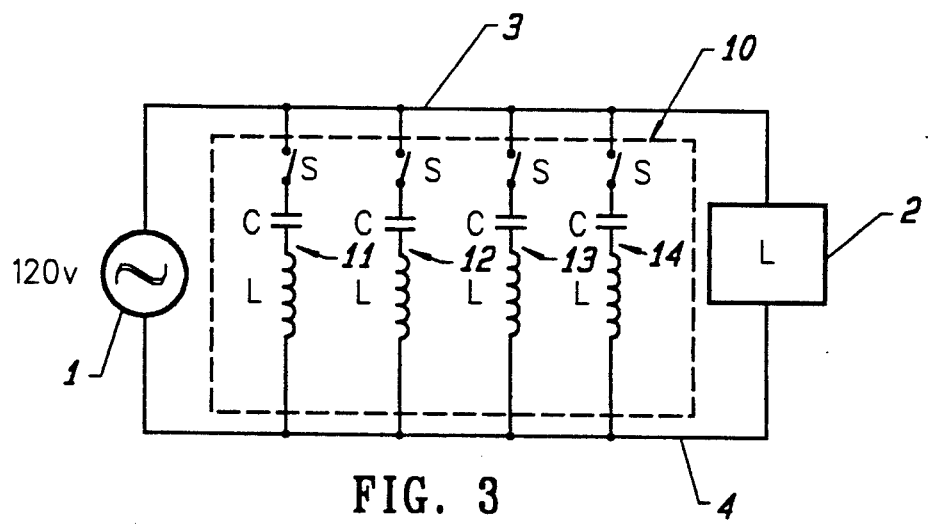
FIG. 3 is a schematic diagram of a plurality of series LC circuits coupled in parallel across the output of a source of A.C. power according to the present invention.

Referring to FIG. 3, there is provided in accordance with a first embodiment of the present invention a filter network designated generally as 10. Network 10 comprises a plurality of parallel coupled LC circuits 11, 12, 13, 14. Each of the circuits 11-14 comprises a switch S, a capacitor C and an inductor L coupled in series between the power supply lines 3 and 4. Each of the circuits 11-14 are tuned to a different resonant frequency, $F_1$, $F_2$, $F_3$ and $F_4$, respectively, all of which are above 60 Hz.

Figure 4:
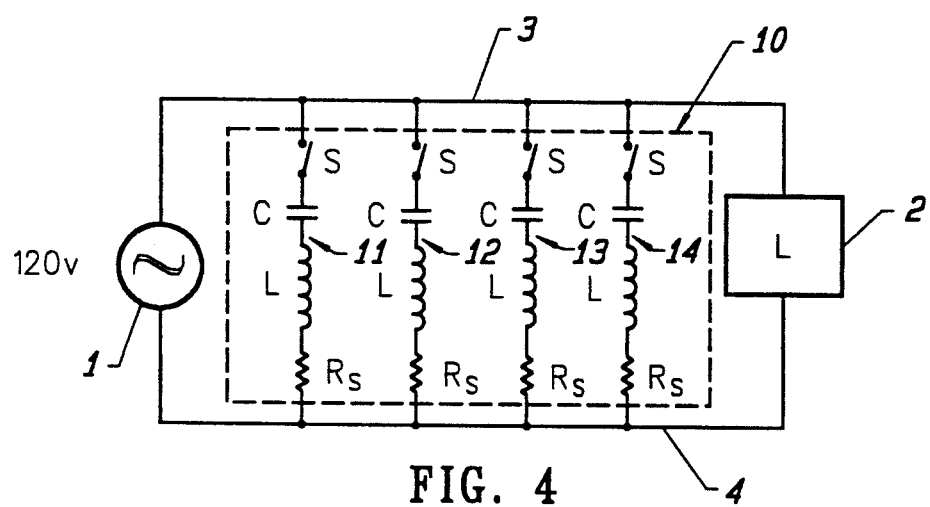
FIG. 4 is a schematic diagram of the circuit of FIG. 3 with a resistor in series with each of the LC circuits.
Figure 5:
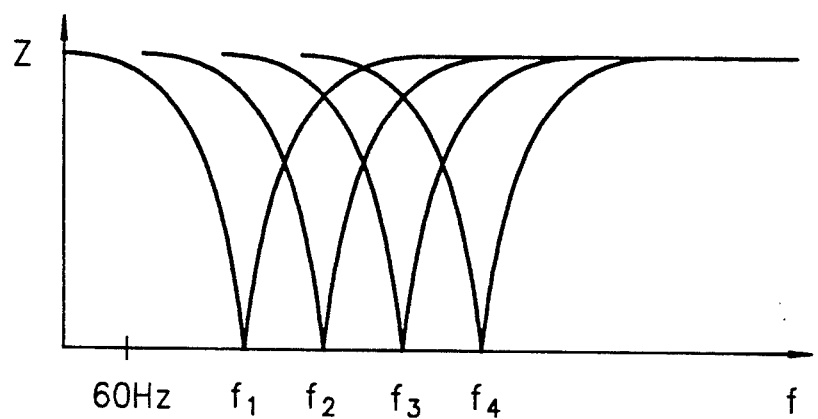
FIG. 5 is a representative plot of impedance v. frequency of the circuits of FIGS. 3 and 4.

Referring to FIG. 5, there is shown a representative plot of impedance v. frequency for each of the resonant circuits in FIGS. 3 and 4. As shown in FIG. 4, a low, e.g. close to zero, impedance node exists at each of the frequencies $F_1$-$F_4$.

Figure 6:
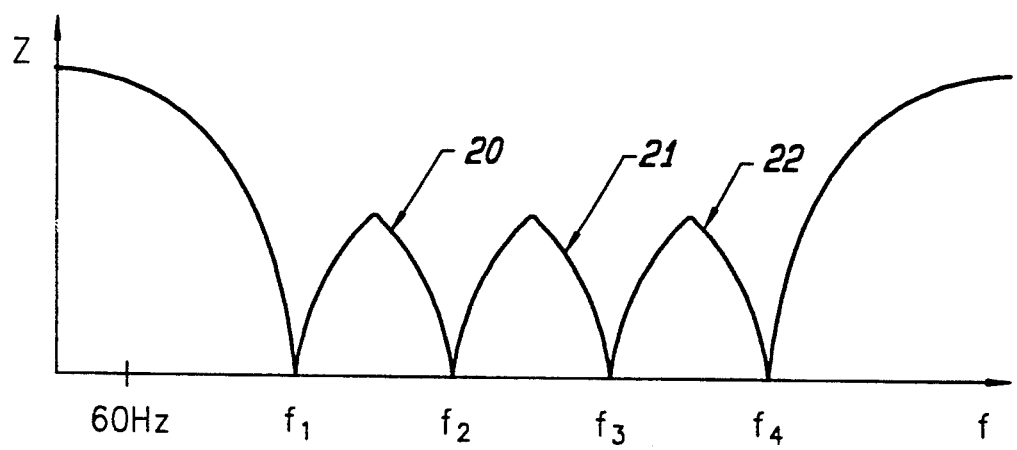
FIG. 6 is a representative plot of the combined resultant of the impedance v. frequency for the circuits of FIGS. 3 and 4.

Referring to FIG. 6, there is shown the combined resultant of the impedance v. frequency curves of FIG. 5. When the impedance curves of FIG. 5 are combined, it can be seen that the impedance of the circuits of FIGS. 3 and 4 is substantially reduced between the frequencies $F_1$ and $F_4$ as shown by the curves 20, 21 and 22.

Figure 7:
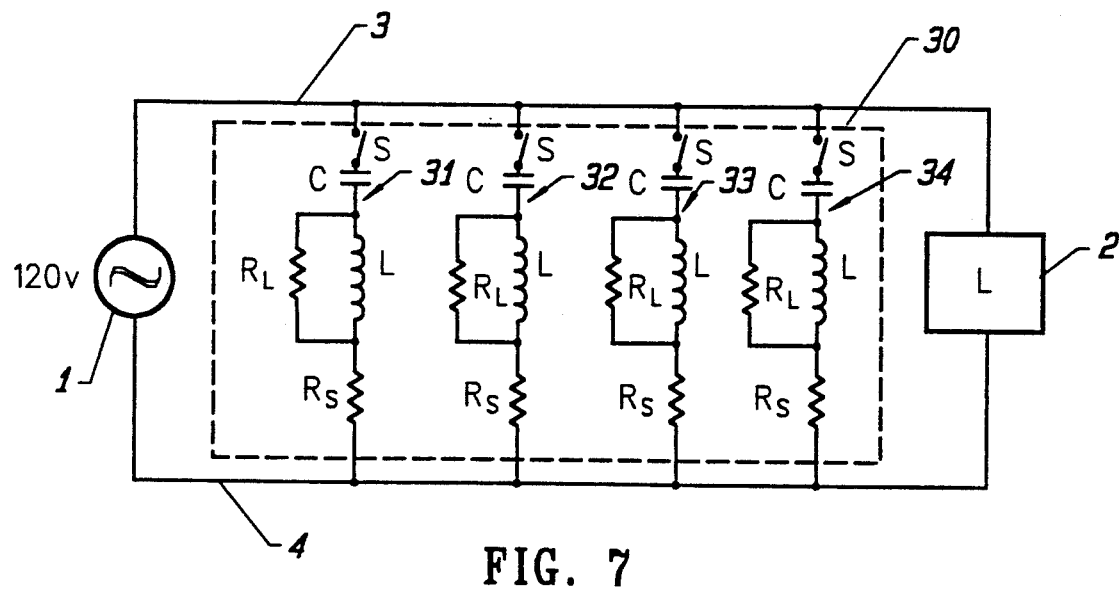
FIG. 7 is a schematic showing a resistance in series with the LC circuits and in parallel with the inductor for dampening oscillations and rendering each of the circuits resistive above their respective resonant frequency.

Referring to FIG. 7, the normal impedance rise due to inductive reactance ($X_L$) can be limited in value by placing a resistor $R_L$ across the inductor. This will cause the impedance to be resistive at frequencies above resonance. Accordingly, there is provided as shown in FIG. 7 a filter network designated generally as 30 comprising a plurality of parallel coupled RLC circuits 31, 32, 33 and 34. In each of the circuits 31-34 there is provided an inductor L, a capacitor C and a resistor $R_S$ coupled in series. Coupled in parallel with the inductor L there is provided a resistor $R_L$.

Figure 8:
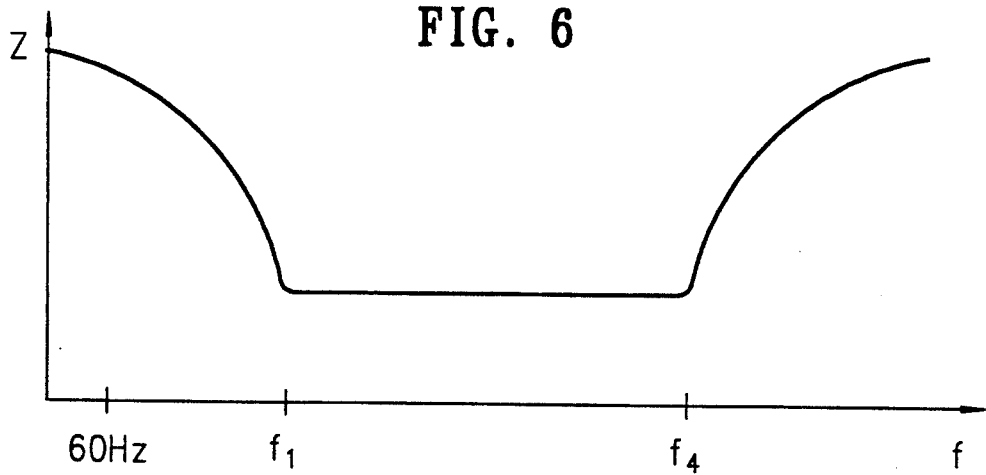
FIG. 8 is a representative plot of impedance v. frequency showing that the impedance of the circuit of FIG. 7 can be made relatively constant, i.e. independent of frequency, and therefore resistive over a wide frequency range.

Referring to FIG. 8, there is shown a representative plot of the impedance v. frequency for the circuit of FIG. 7, wherein the impedance of the circuit between the frequencies $F_1$ and $F_4$ is substantially independent of frequency, i.e. resistive.

Figure 9:
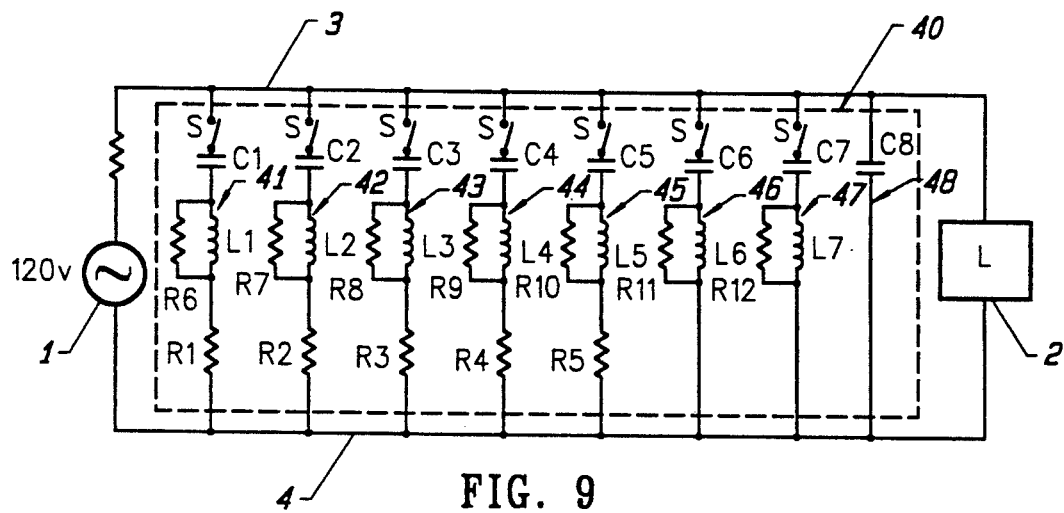
FIG. 9 is a specific embodiment of a filter network according to the present invention.

Referring to FIG. 9, there is shown a specific embodiment of a filter network 40 according to the present invention comprising a plurality of parallel coupled RLC circuits 41, 42, 43, 44, 45, 46 and 47 and a parallel coupled capacitor 48. The circuits 41-47 comprise capacitors C1-C7, respectively. Coupled in series with the capacitors C1-C7 there is provided an inductor L1-L7, respectively. A plurality of resistors R1-R5 are coupled in series with inductors L1-L5, respectively. Coupled in parallel with each of the inductors L1-L7 in the circuits 41-47 there is provided a plurality of resistors R6-R12, respectively. The capacitor 48 is also designated C8. The above-described capacitors, inductors and resistors of FIG. 8 have the following typical values:

| | |
|---|---|
| C1 = | 8.8 μf |
| C2 = | 6.6 μf |
| C3 = | 5.4 μf |
| C4 = | 4.4 μf |
| C5 = | 3.2 μf |
| C6 = | 2.2 μf |
| C7 = | 1.0 μf |
| C8 = | 0.47 μf |
| L1-L7 = | .56 mH |
| R1-R5 = | 1.0 ohm |
| R6-R12 = | 27.0 ohms | where μf is a designation for microfarad and mH is a designation for millihenry.

In each of the embodiments of FIGS. 3-5 and 7 an optional switch S may be provided to enable an operator to selectively remove one or more of the LC circuits from the network as desired.

Figure 10:
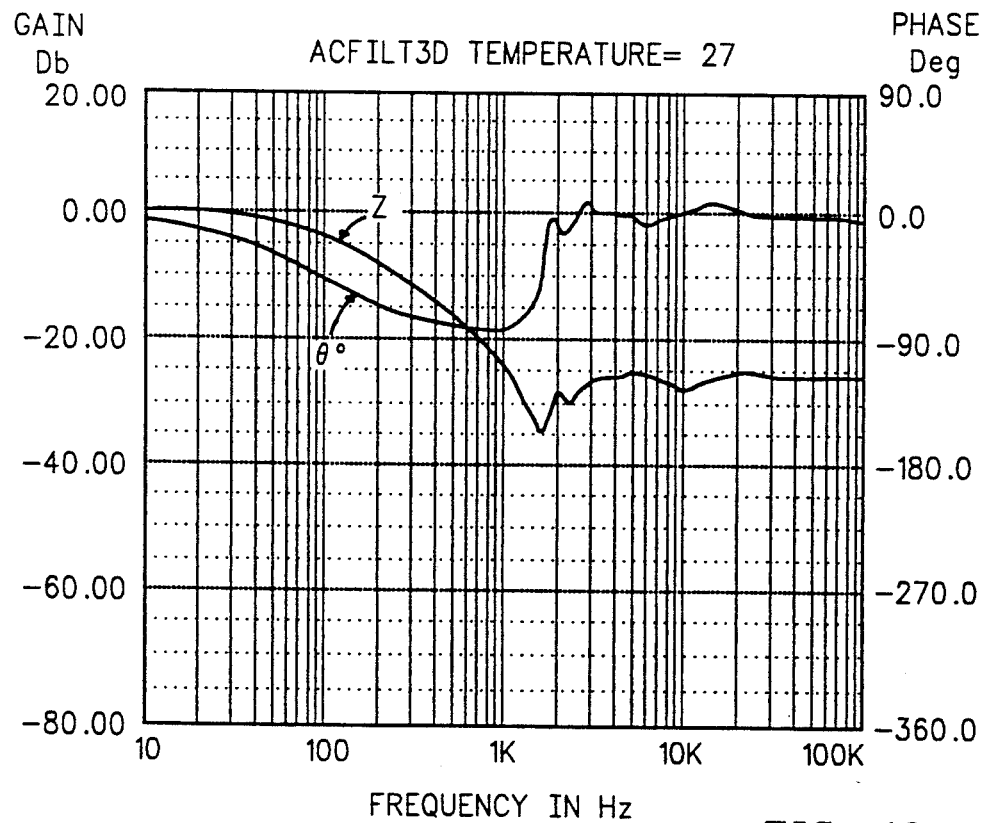
FIG. 10 is a plot of impedance and phase shift for the circuit of FIG. 9.

Referring to FIG. 10, there is shown a plot of gain, i.e. attenuation, and phase shift v. frequency for the circuit of FIG. 9 wherein the load 2 comprises a resistive circuit of approximately 100K ohms. As will be seen from the plot in FIG. 10, the circuit 40 of FIG. 9 attenuates the output power from the source 1 as a function of frequency wherein the attenuation begins just above 60 Hz and reaches a maximum of 25-30 dB at 1 KHz and greater such that the impedance of the power source as seen by the load 2 decreases toward a very low impedance between the supply lines to all frequencies above 60 Hz and is substantially resistive above 1 KHz.

With respect to choosing values of capacitance and inductance to achieve zero phase shift and a low stable impedance at frequencies above 60 Hz in accordance with the present invention, it should be noted that various combinations of capacitance and inductance can be used. However, to maximize the power factor of the circuit, i.e. maximize the efficiency at which power is delivered from the source 1 of 60 Hz power to the audio equipment 2, it is necessary to insert in the filter network of all of the above-described embodiments a total amount of capacitance (C1+C2+C3...C8) in different combinations of capacitors sufficient to cancel or substantially cancel the input inductive reactance at 60 Hz of all of the audio equipment likely to be coupled to the power line, the inductive reactance of the power line itself at 60 Hz being negligible.

To determine the amount of capacitance required to obtain a maximum power factor equal to 1, or 100%, it would be necessary to measure the inductive reactance at 60 Hz of each load coupled to the power line. Since this is not possible as a practical matter, the inductive reactance at the power supply input of typical audio equipment coupled to the power line was measured. It was found that a maximum capacitance of approximately 30 microfarads ($\mu f$) was sufficient to substantially cancel the input inductive reactance at 60 Hz of the most heavily inductive loads and that lesser amounts of capacitance could and should be used in other cases.

In many cases, such as in a residential environment or the like, the operator of the audio equipment does not have the apparatus to measure the input inductive reactance of the equipment. In such cases the switches S of FIGS. 3, 4, 7 and 9 are used to selectively switch the desired amount of capacitance into or out of the circuit depending on how the audible signal sounds to the operator. In other words, in the absence of apparatus to measure the actual input inductive reactance of the audio equipment coupled to the A.C. power line filter, the operator, using the switches S, adds and removes selected ones of the LC or RLC circuits until the maximum dynamic range of the equipment is obtained.

In a preferred embodiment of the present invention the filter and power factor compensation network is embodied in a device which can be plugged into one of the two pairs of sockets in a conventional duplex power socket. In this manner, the network bridges the power supply lines and is able to be used for maximizing the power factor for any combination of equipment coupled to the other socket. Alternatively, the network could be plugged into a conventional power strip adjacent to the plugs of the audio equipment.

While preferred embodiments of the present invention are described above, it is contemplated that numerous modifications may be made thereto for particular applications without departing from the spirit and scope of the present invention. For example, while network 40 is described as comprising seven parallel RLC circuits and a parallel capacitor, there are no theoretical limits to the number of such resonant circuit stages that may be used to extend the low impedance range to cover a wider frequency span and/or a wider range of inductive reactance of loads coupled thereto than that achieved with the network 40 of FIG. 8. Accordingly, it is intended that the embodiments described be considered only as illustrative of the present invention and that the scope thereof should not be limited thereto but be determined by reference to the claims hereinafter provided.

What is claimed is:

1. A filter and power factor compensation network for filtering 60 Hz A.C. power and adjusting the power factor of 60 Hz A.C. power being supplied to audio equipment comprising:
   a plurality of circuits, each of said circuits comprising an inductor and a capacitor coupled in series; and
   means for selectively coupling together in parallel across 60 Hz AC power supply lines to which the audio equipment is also coupled, a selected combination of said plurality of circuits so that the total amount of the capacitive reactance of the selected combination of the plurality of circuits is as close as possible to that required to substantially cancel the inductive reactance of the audio equipment to the 60 Hz input power being supplied to the audio equipment.

2. A network according to claim 1 wherein said coupling means comprises switch means coupled in series with each of the series circuits.

3. A network according to claim 1 wherein said coupling means comprises means for plugging said network into a conventional female electrical connector of the type normally used to supply power to household appliances.

4. A network according to claim 3 wherein said female connector comprises a conventional female duplextype connector.

5. A network according to claim 3 wherein said female connector comprises a conventional female power strip-type connector.

6. A network according to claim 1 wherein the total capacitance in said plurality of circuits is approximately 30 microfarads.

7. A network according to claim 1 wherein the capacitance in one of the plurality of circuits is approximately one microfarad greater than the capacitance in the circuit having the next lowest amount of capacitance.

8. A network according to claim 1 wherein the total capacitance in said plurality of circuits ranges from a low of approximately 0.47 microfarads to a high of approximately 8.8 microfarads.

9. A method for adjusting the power factor of 60 Hz A.C. power being supplied to audio equipment comprising:
   providing a plurality of circuits, each of said circuits comprising an inductor and a capacitor coupled in series; and
   selectively coupling together in parallel across 60 Hz AC power supply lines to which the audio equipment is also coupled, a selected combination of said plurality of circuits so that the total amount of the capacitive reactance of the selected combination of the plurality of circuits is as close as possible to that required to substantially cancel the inductive reactance of the audio equipment to the 60 Hz input power being supplied to the audio equipment.

10. A method according to claim 9 wherein said coupling step comprises the step of plugging said network into a conventional female electrical connector of the type normally used to supply power to household appliances.

11. A method according to claim 9 wherein the total capacitance in said plurality of circuits is approximately 30 microfarads.

12. A method according to claim 9 wherein the capacitance in one of the plurality of circuits is approximately one microfarad greater than the capacitance in the circuit having the next lowest amount of capacitance.

13. A method according to claim 9 wherein the total capacitance in said plurality of circuits ranges from a low of approximately 0.47 microfarads to a high of approximately 8.8 microfarads.

* * * * *

UNITED STATES PATENT AND TRADEMARK OFFICE
CERTIFICATE OF CORRECTION

PATENT NO. : 5,227,962

DATED : July 13, 1993

INVENTOR(S) : RICHARD N. MARSH

It is certified that error appears in the above-identified patent and that said Letters Patent is hereby corrected as shown below:

Column 1, lines 8 and 9, delete "now abandoned".

Signed and Sealed this

First Day of February, 1994

Attest:

BRUCE LEHMAN

*Attesting Officer*      Commissioner of Patents and Trademarks